(12) United States Patent
Adler

(10) Patent No.: US 7,990,364 B2
(45) Date of Patent: Aug. 2, 2011

(54) POINTING DEVICE AND ASSOCIATED METHOD OF OPERATING

(75) Inventor: Jonathan Adler, Edinburgh (GB)

(73) Assignee: STMicroelectronics Ltd., Marlow, Buckinghamshire (GB)

( * ) Notice: Subject to any disclaimer, the term of this patent is extended or adjusted under 35 U.S.C. 154(b) by 937 days.

(21) Appl. No.: 11/398,042

(22) Filed: Apr. 5, 2006

(65) Prior Publication Data
US 2006/0238509 A1   Oct. 26, 2006

(30) Foreign Application Priority Data

Apr. 23, 2005   (EP) .................................... 05252550

(51) Int. Cl.
*G09G 5/00*   (2006.01)
(52) U.S. Cl. ......... 345/156; 345/161; 345/162; 345/163
(58) Field of Classification Search .................. 345/157, 345/158, 166, 169, 161–163
See application file for complete search history.

(56) References Cited

U.S. PATENT DOCUMENTS

| | | | | |
|---|---|---|---|---|
| 4,409,479 A | * | 10/1983 | Sprague et al. | 250/237 G |
| 5,260,696 A | | 11/1993 | Maynard, Jr. | 345/163 |
| 5,565,887 A | | 10/1996 | McCambridge et al. | 345/145 |
| 5,877,748 A | * | 3/1999 | Redlich | 345/163 |
| 6,097,371 A | | 8/2000 | Siddiqui et al. | 345/164 |
| 6,256,016 B1 | * | 7/2001 | Piot et al. | 345/166 |
| 6,618,037 B2 | * | 9/2003 | Sakamaki et al. | 345/163 |
| 6,771,280 B2 | * | 8/2004 | Fujisaki et al. | 345/684 |
| 6,906,697 B2 | * | 6/2005 | Rosenberg | 345/156 |
| 7,280,096 B2 | * | 10/2007 | Marvit et al. | 345/156 |
| 7,567,234 B2 | * | 7/2009 | Anderson | 345/163 |
| 2002/0158843 A1 | | 10/2002 | Levine et al. | 345/157 |

FOREIGN PATENT DOCUMENTS

EP   1 361 537   11/2003

OTHER PUBLICATIONS

Les Richardson, "Using Microsoft Paint", dated Jul. 19, 2001; XP-002338264, p. 4, lines 22-23.
"Atypical Mice and Related Devices", N. Davids, Computer, vol. 28, No. 6, Jun. 1, 1995, pp. 92-95, ISSN: 0018-9162.

* cited by examiner

*Primary Examiner* — Richard Hjerpe
*Assistant Examiner* — Sahlu Okebato
(74) *Attorney, Agent, or Firm* — Lisa K. Jorgenson; Allen, Dyer, Doppelt, Milbrath & Gilchrist, P.A.

(57) ABSTRACT

The pointing device is used in connection with a computer system, and has a sensor for sensing data representing a displacement information in at least two spatial coordinates. The device is capable of toggling between a first and a second mode of operation, and also adjusting the displacement information referring to a first of the two spatial coordinates (i.e. first displacement information) in view of a second of the two spatial coordinates (i.e. second displacement information) when the second mode of operation is activated.

17 Claims, 4 Drawing Sheets

POINTING DEVICE AND ASSOCIATED METHOD OF OPERATING

FIELD OF THE INVENTION

The invention is related to a pointing device, and more particularly a pointing device used in connection with a computer system, such as a mouse, track ball, optical mouse/track ball or a wireless optical mouse/track ball etc., and to a method of operating such a pointing device.

BACKGROUND OF THE INVENTION

Pointing devices such as a mouse or a track ball, are well known, and with state of the art computer systems using graphical user interfaces, next to the keyboard, such pointing devices are the main input devices for operating the computer system. Typically pointing devices such as a mouse or a track ball include at least one sensor for sensing data representing displacement information in at least two spatial coordinates. A typical low cost computer mouse may include one sensor for both of the at least two spatial coordinates. In more modern pointing devices, such as an optical mouse or an optical track ball, consecutive images of a surface on which the mouse is moved on, or the surface of a ball in the mouse or the track ball, are analyzed and compared, and the displacement information in at least two spatial coordinates is derived from comparing consecutive images.

While the above pointing devices have become widely accepted for state of the art computer workstations, improvements of such devices are mostly focused on their reliability and the production costs. However, the basic functionality, namely providing software applications running on a computer workstation with displacement information in at least two spatial coordinates, has not been revised since the first pointing devices have been conceived.

SUMMARY OF THE INVENTION

It is therefore an object of the present invention, to complement the functionality of pointing devices when providing an associated computer and/or a software application with displacement information.

These and other objects may be achieved with a pointing device, such as an optical mouse or a wireless optical mouse, for use in connection with a computer system, including at least one sensor for sensing data representing displacement information in at least two spatial coordinates. According to the invention the pointing devices includes the capability of toggling between a first and a second mode of operation, and also adjusting the displacement information referring to a first of the at least two spatial coordinates, hereinafter "first displacement information", in view of the second of the at least two spatial coordinates, hereinafter "second displacement information", when the second mode is activated.

Adjusting the first displacement information in view of the second displacement information or vice versa, for example, allows a user of such a pointing device to draw orthogonal and/or diagonal lines or to move objects along orthogonal and/or diagonal paths on the screen. Most users using standard pointing devices will acknowledge the benefit of such functionality.

The toggling between the first and second mode of operation could be provided by a mode selector such as an additional pushbutton in an appropriate position on the outer surface of the housing of the pointing device. Alternatively, toggling the mode of operation could employ the keys already present on the pointing device and could, for example, process the duration for which one or more of the keys of the pointing devices are activated, or could process a certain succession in which the keys are activated, or a combination of those to detect the mode change.

Preferably, an adjuster or means/unit for adjusting the displacement information comprises a comparator or means/unit for comparing the first and second displacement information and also a means/unit for resetting and/or deleting the smaller of the first and second displacement information. If the pointing device is operated in the second mode of operation, i.e., if the user, for example, wants to draw orthogonal lines, corresponding displacement information from the pointing device is required. Such orthogonal displacement information is derived according to the invention by comparing the first and second displacement information and by resetting and/or deleting and/or discarding the smaller of the first and second displacement information.

The comparator or means/unit for comparing the displacement information could be a standard comparator, which is well known in the art. The means/unit for resetting and/or deleting the smaller of the first and second displacement information could, for example, be a logical XOR-circuit, XOR-ing the relevant displacement information with itself. It is to be understood, that in a preferred embodiment, resetting and/or deleting the smaller of the first and second displacement information relates only to the displacement information transmitted to the associated computer system or a software application running on the computer system. The original displacement information may still be maintained within the pointing device to be able to switch between horizontal or vertical lines or movements as soon as previously discarded displacement information increases the other displacement information.

The adjuster or adjusting means/unit is preferably a microprocessor or a similar device capable of processing instructions relating to the implementation of the method according to the invention in software or hardware.

In a further advantageous embodiment of the invention, either the pointing device or the method of operating the pointing device enables the adjustment of the displacement information to allow drawing of diagonal lines or moving along a diagonal path. This is accomplished by comparing the first and second displacement information and adjusting the value of the first displacement information to the value of the second displacement information, or vice versa, provided that the value of the first displacement information is not exceeding the second displacement information for more than a pre-defined or pre-definable threshold. In essence, the adjustment for diagonal lines/movement is accomplished in such a way that as long as the first and the second displacement information are "more or less the same", the value of the first/second displacement information is adjusted to the second/first displacement information or vice versa. The threshold is preferably a multiplicative threshold and the threshold is preferably in the range of 0.5 to 2.0. Therefore, as long as one of the displacement information is no less than half of the other displacement information and not larger than twice the other displacement information, both displacement informations are regarded as being "more or less the same" and the value of one displacement information is adjusted to the value of the other displacement information. However, other threshold values such as 0.75 and 1.25, etc. may be used instead of the above mentioned threshold values.

Using the threshold can also lead to a control scheme for distinguishing between orthogonal lines/movements and diagonal lines/movements in that as long as the relation of the first and the second displacement information remains within the range of the pre-defined or pre-definable threshold, the pointing device or the method of operating the pointing device will provide displacement information reflecting diagonal lines/movements. As soon as the relation between the first and second displacement information exceeds the threshold range, the pointing device or the method of operating the pointing device will provide displacement information reflecting orthogonal lines or orthogonal movements.

The essential advantages of the invention are that the user can draw orthogonal and/or diagonal lines and utilize orthogonal and/or diagonal movement in each computer program (application) provided on a computer system, regardless of the functionality of the relevant application in this regard, since the invention allows for intercepting the displacement information provided by the pointing device to the application directly.

Adjusting the displacement information as described above can be accomplished in the part of the pointing device which is physically external of the computer system, namely via electronics included in the housing of the pointing device or in a software application associated with the pointing device, the so-called "driver", which provides the displacement information for other applications running on the computer. In this regard, the above driver is to be regarded as an integral part of the pointing device, since the pointing device is fully operational only when its software part, the driver, and its hardware part, the tangible components of the pointing device, interact in the appropriate manner.

The invention also includes the pointing as described above, comprising means or units, such as adjusting and toggling means or units, for performing the steps of the method as described above.

The invention is furthermore also concerned with the use of the pointing device as described above as an optical mouse/track ball or as a wireless optical mouse/track ball.

BRIEF DESCRIPTION OF THE DRAWINGS

Other features and advantages of the present invention will appear from the following description of a preferred embodiment of the invention, given as a non-limiting example, illustrated in the drawings. All the elements which are not required for the immediate understanding of the invention are omitted. In the drawing, the same elements are provided with the same reference numerals in the various drawings in which.

DETAILED DESCRIPTION OF THE PREFERRED EMBODIMENTS

Figure 1:
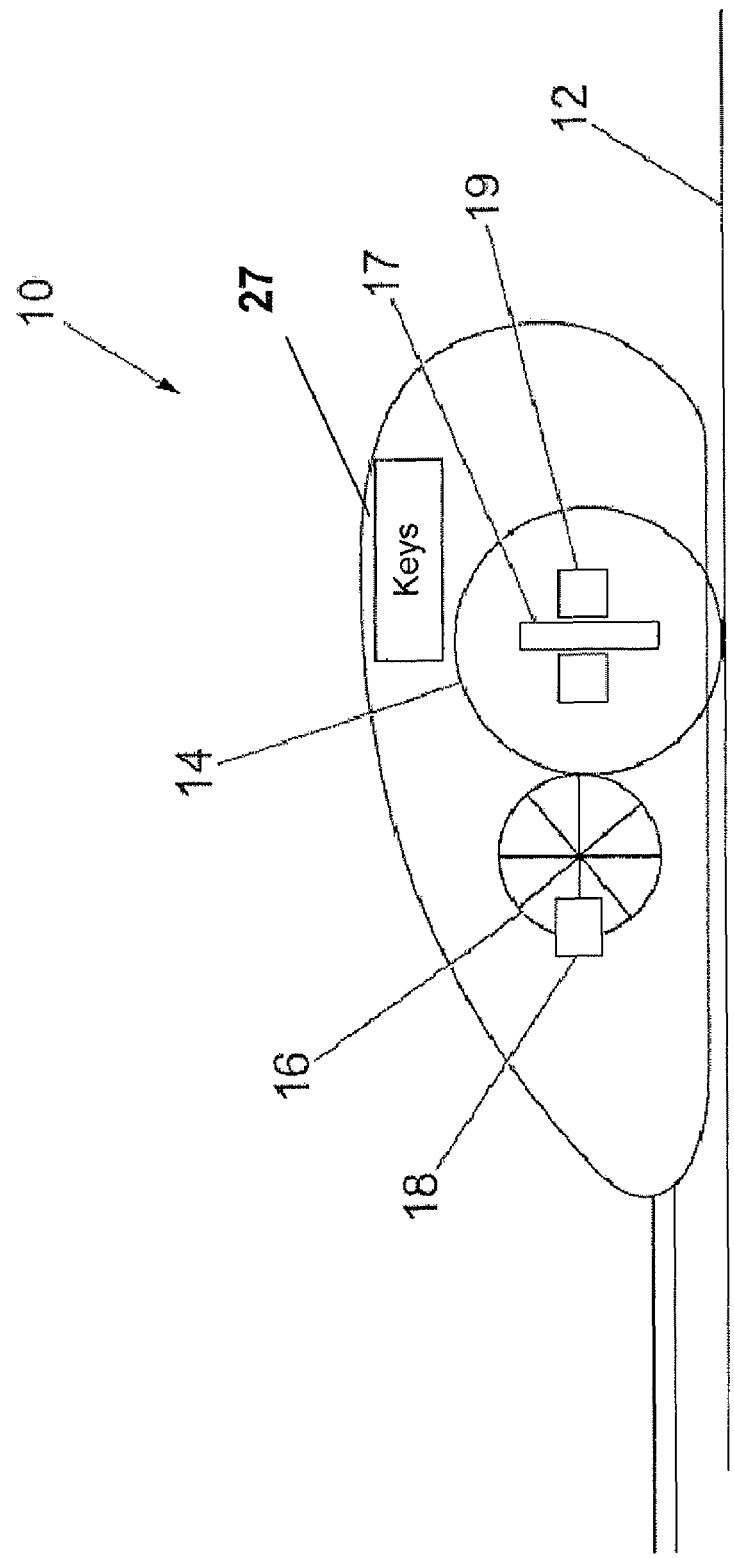
FIG. 1 is a schematic diagram illustrating a pointing device in accordance with the present invention.

FIG. 1 shows as an example of a pointing device, a computer mouse 10 in a schematic and simplified manner. The computer mouse 10 is operated on a flat surface 12, where when moving the mouse 10, the movement is transferred to a rotatable ball 14 within the housing of the mouse 10. The movement of the ball 14 in turn is transferred to two apertured discs 16, 17 oriented perpendicular to each other. The rotation of each disc 16, 17 is sensed via a sensor 18, 19 associated with each disc 16, 17. The sensor 18, 19 can be an optoelectronic sensor receiving a signal whenever an aperture in the disc 16, 17 passes in front of the sensor 18, 19. The number of signals is indicative of the displacement of the mouse 10 in one of at least two spatial coordinates.

These spatial coordinates are x- and y-coordinates when the pointing device, i.e., the mouse 10, is moved across the flat surface 12. However, the pointing device may be a so-called 3D pointing device providing displacement information in three spatial coordinates. The mouse 10 shown in FIG. 1 is a very simple embodiment of a pointing device and purely shown for purposes of explanation. However, it is to be understood, that the invention relates to all types of pointing devices, such as an optical mouse, a 3D mouse, etc.

Figure 2:
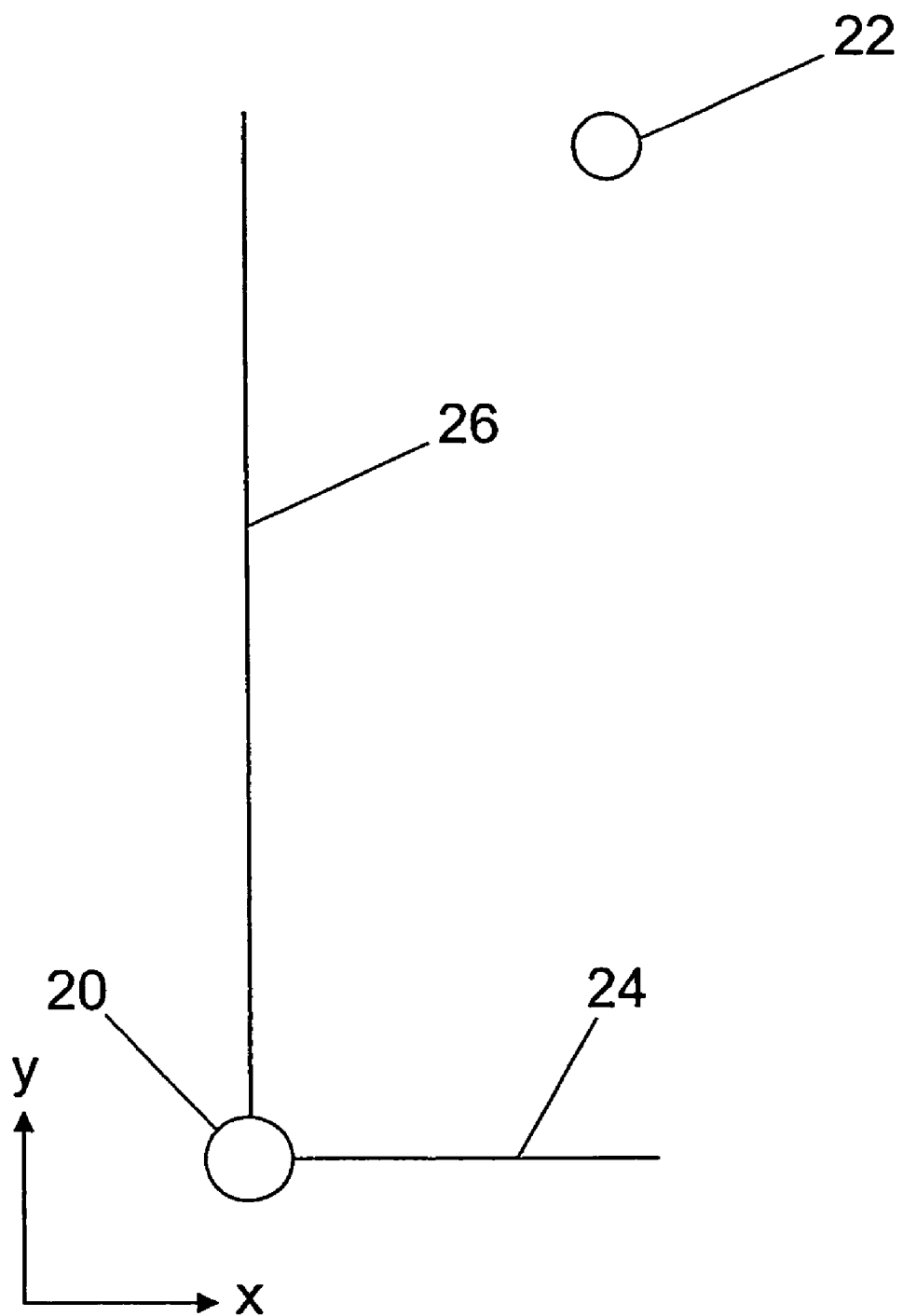
FIG. 2 is a diagram illustrating the orthogonal lines.

FIG. 2 shows a starting point 20 of a movement of the mouse 10 and an end point 22 of such movement. It is clear from the drawing, that moving from the starting point 20 to the end point 22 requires moving for some amount along a first spatial coordinate, for example along the x-coordinate, and for some amount along a second spatial coordinate, for example along the y-coordinate. The connection between the starting point 20 and the end point 22 is a line in the 2D plane. However, a line from the starting point 20 to the end point 22 is not orthogonal with respect to the xy-coordinate system since the difference of the xy-coordinates of the starting point 20 and the xy-coordinates of the end point 22 is greater than zero with respect to both the x- and the y-part of the difference. However, an orthogonal line would result from either deleting the x- or the y-part of said difference.

The resulting orthogonal lines 24, 26 differ from each other in that a first orthogonal line 24 parallel to the x-axis has an overall length of the distance between the starting point 20 and the end point 22 along the x-axis and in that a second orthogonal line 26 parallel to the y-axis has an overall length of the distance between the starting point 20 and the end point 22 along the y-axis.

If the mouse 10 is operated in a mode which only allows for movement along orthogonal and/or diagonal paths, the question arises with a first position information relating to the starting point 20 and a second position information relating to the end point 22 whether the user wanted to move along the first 24 or along the second 26 orthogonal line. According to the invention, this is addressed by assuming that since the length of the second orthogonal line 26 is greater than the length of the first orthogonal line 24, or since the y-part of the distance between the starting point 20 and the end point 22 is greater than the relevant x-part, it is more likely that the user operating the mouse wanted 10 to indicate a movement generally along the y-axis. When transmitting the displacement information the x-part of the displacement information is discarded/deleted, or simply not transmitted to the computer or the application receiving the displacement information at all. This applies for cases where transmission refers to a transmittal from the tangible portion of the pointing device to the computer, or to a transmittal from the driver associated to the pointing device to the relevant application processing the displacement information.

Figure 3:
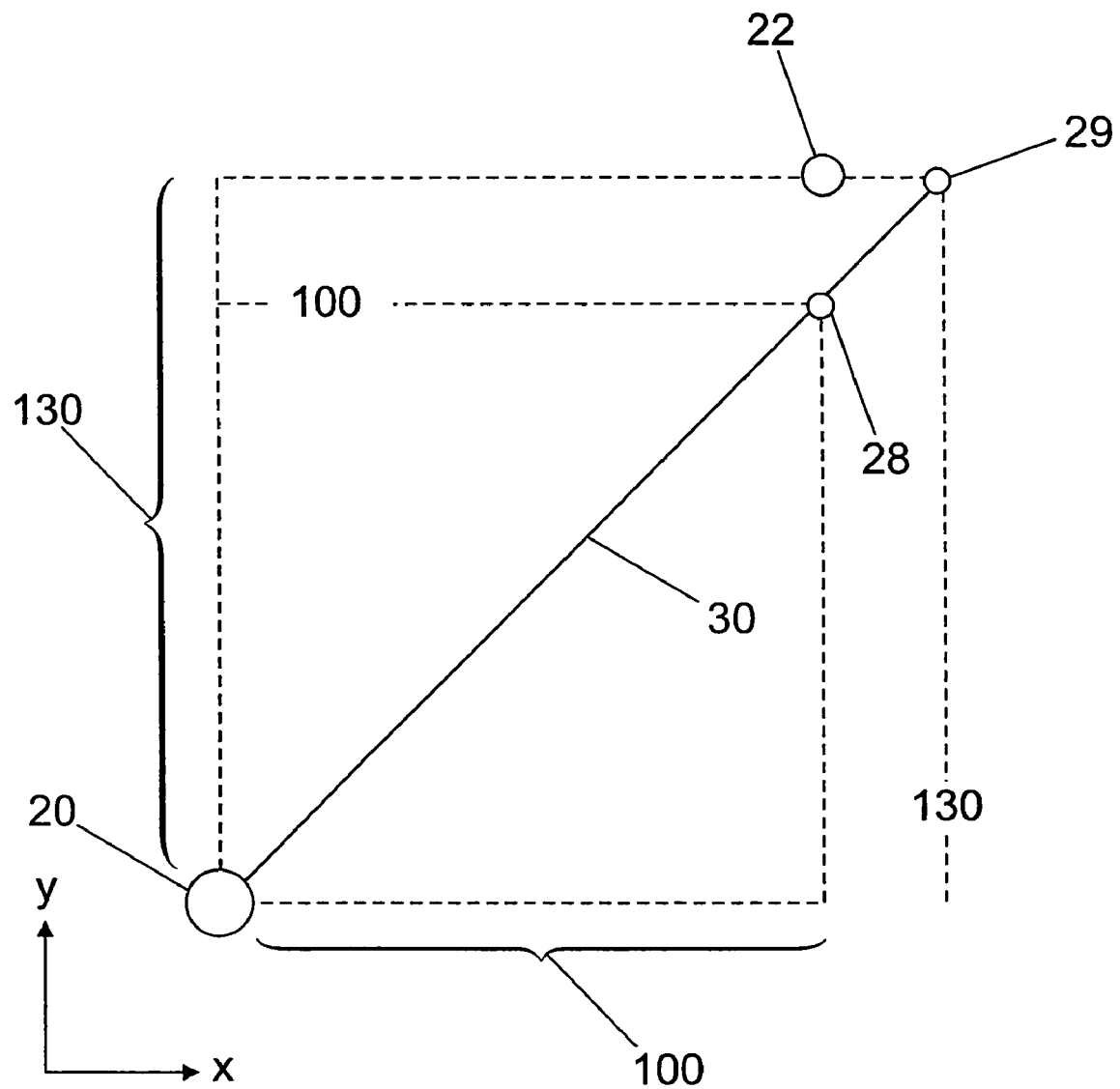
FIG. 3 is a diagram illustrating the diagonal lines.

FIG. 3 shows a situation where the x-part and the y-part of the distance between starting point 20 and end point 22 would be "more or less the same" or substantially the same. In the depicted example, the x-displacement represents a distance of 100 units and the y-displacement represents a distance of 130 units, which applying certain predefined thresholds for the relation between the x-displacement and the y-displacement, would qualify as being "more or less the same". The relation between the 100 units displacement and the 130 units displacement is 1.3; and thus, within the threshold of e.g., 2.0. As soon as the first displacement information is set to the value of the second displacement information, or vice versa, a diagonal line or diagonal movement would be the result. The two points 28, 29 on the resulting diagonal line 30 reflect the case where the 100 units displacement information (point 28) or the 130 units displacement information (point 29) is used to obtain displacement information for diagonal lines/movements.

Figure 4:
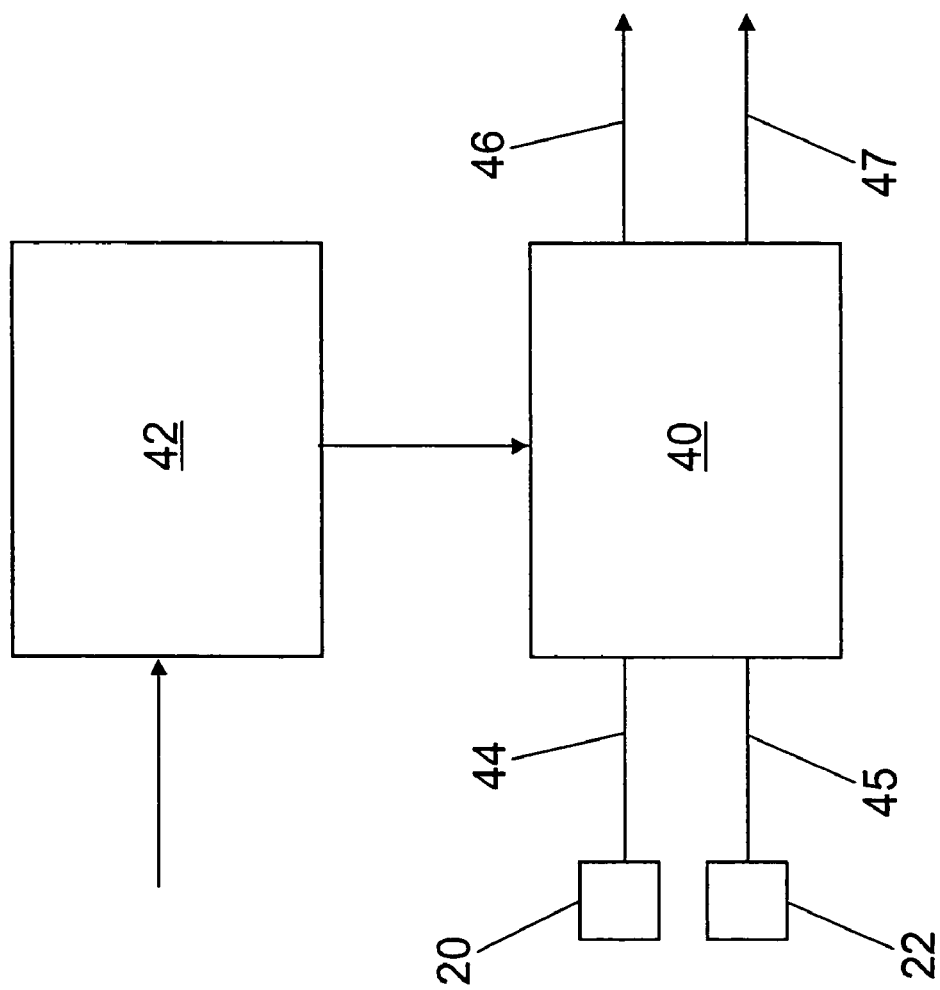
FIG. 4 is a simplified block diagram illustrating the pointing device of FIG. 1.

FIG. 4 shows a simplified block diagram of a pointing device, i.e., the mouse 10. According to the block diagram, the displacement information obtained from the sensors 18, 19 is fed to a means or unit 40 for adjusting the displacement information—and adjuster or adjusting means 40. The adjusting means 40 is activated via a mode selector or means or unit 42 for toggling between a first and a second mode of operation—toggling means 42. The toggling means 42, in turn, receives input information, for example, from the button or buttons provided on the mouse 10. Whenever the toggling means 42 indicates a mode change, the respective mode is signaled to the adjusting means 40. In "normal" operation the adjusting means 40 is essentially inactive, i.e., any displacement information 44, 45 (first displacement information 44, second displacement information 45) received as input is provided at the output unchanged. If the toggling means 42 indicates a mode change into a mode where the displacement information 44, 45 is to be adjusted (second mode of operation or "ortho mode"), signaling the respective mode information activates the adjusting means 40. The adjusting means 40 adjusts the displacement information received as input, according to the schemes as described above and provides adjusted displacement information 46, 47 (first adjusted displacement information 46, second adjusted displacement information 47) as output. To accomplish this, the adjusting means 40 comprises at least comparator functionality and functionality for performing logical and/or arithmetic operations. Thus, the adjusting means 40 and/or the toggling means 42 can be embodied in software and/or in hardware.

Alternatively, toggling the mode of operation could employ the keys 27 already present on the pointing device and could, for example, process the duration for which one or more of the keys of the pointing devices are activated, or could process a certain succession in which the keys are activated, or a combination of those to detect the mode change. Although a preferred embodiment of the invention has been illustrated and described herein, it is recognized that changes and variations may be made without departing from the invention as set forth in the claims.

In sum, the invention can be described as relating to a pointing device, especially a pointing device used in connection with a computer system, the device having at least one sensor 18, 19 for sensing data representing a displacement information 44, 45 in at least two spatial coordinates. The device includes a means or unit 42 for toggling between a first and a second mode of operation, and also a means or unit 40 for adjusting the displacement information 44, 45 referring to a first of the at least two spatial coordinates—first displacement information 44—in view of a second of the at least two spatial coordinates—second displacement information 45—when the second mode of operation is activated.

That which is claimed is:

1. A computer system pointing device comprising: a plurality of keys; at least one sensor configured to sense data representing displacement information in x-y plane coordinates; a mode selector module configured to toggle between a first and a second mode of operation based upon said plurality of keys receiving a desired input sequence; and an adjuster configured to adjust the displacement information by at least adjusting a first of the x-y plane coordinates defined as first displacement information based upon a second of the x-y plane coordinates defined as second displacement information, when the second mode of operation is selected, and when the first mode of operation is selected, to perform no adjustment to the displacement information; said adjuster comprising a comparator configured to compare the first and second displacement information, and a resetting unit configured to reset one of the first and second displacement information based upon size of a respective displacement value in the first and second displacement information and the adjuster is configured to adjust the value of the first displacement information to the value of the second displacement information when the value of the first displacement information does not exceed the second displacement information by more than a threshold.

2. The computer system pointing device of claim , wherein the pointing device is an optical mouse or a wireless optical mouse.

3. The computer system pointing device of claim 1, wherein the threshold is a multiplicative threshold in the range of 0.5 to 2.0.

4. The computer system pointing device of claim 1, wherein the resetting unit comprises an XOR circuit.

5. A computer system pointing device comprising: a plurality of keys; at least one sensor configured to sense data representing displacement information in x-y plane coordinates; a mode selector module configured to toggle between a first and a second mode of operation based upon said plurality of keys receiving a desired input sequence; and an adjuster configured to adjust the displacement information to reflect at least one of diagonal and orthogonal movements based upon a comparison of the displacement information relative to a starting point in the x-y plane coordinates when the second mode of operation is selected, and when the first mode of operation is selected, to perform no adjustment to the displacement information, said adjuster comprising a comparator configured to compare first and second displacement information defined by a first and a second of the x-y plane, coordinates, respectively, and a resetting unit configured to reset one of the first and second displacement information based upon size of a respective displacement value in the first and second displacement information, and the adjuster is configured to adjust the value of the first displacement information to the value of the second displacement information when the value of the first displacement information does not exceed the second displacement information by more than a threshold.

6. The computer system pointing device of claim 5, wherein the threshold is a multiplicative threshold in the range of 0.5 to 2.0.

7. The computer system pointing device of claim 5, wherein the resetting unit comprises an XOR circuit.

8. A method of operating a computer system pointing device having at least one sensor for sensing data representing displacement information in x-y plane coordinates, and a mode selector module to toggle between a first and a second mode of operation based upon a plurality of keys; receiving a desired input sequence, the method comprising: verifying when the second mode of operation is selected; and adjusting the displacement information by at least adjusting a first of the x-y plane coordinates, defined as first displacement information, based upon a second of the x-y plane coordinates, defined as second displacement information, when the second mode of operation is selected, and when the first mode of operation is selected, performing no adjustment to the displacement information, the adjusting comprising comparing the first and second displacement information, and resetting one of the first and second displacement information based upon size of a respective displacement value in the first and second displacement information and adjusting the displacement information comprises: comparing the first and second displacement information; and adjusting a value of the first displacement information to a value of the second displacement information when the value of the first displacement information does not exceed the second displacement information by more than a threshold.

9. The method of claim 8, wherein the threshold is a multiplicative threshold in the range of 0.5 to 2.0.

10. The method of claim 8, wherein the pointing device is an optical mouse or a wireless optical mouse.

11. A computer system pointing device comprising: a plurality of keys; a sensor configured to sense displacement in x-y plane coordinates; a mode selector module configured to toggle between a first and a second mode of operation based upon said plurality of keys receiving a desired input sequence; and an adjuster configured, when in the second mode of operation, to compare first and second x-y plane coordinates and to change the first x-y plane coordinate based upon a size of the second x-y plane coordinate, and when in the first mode of operation, to perform no adjustment to the sensed displacement and the adjuster is configured to adjust the value of the first displacement information to the value of the second displacement information when the value of the first displacement information does not exceed the second displacement information by more than a threshold.

12. The method of claim 8, wherein the resetting uses an XOR circuit.

13. The computer system pointing device of claim 11 wherein when the sensed displacement in one of the first and the second x-y plane coordinates is substantially larger than the sensed displacement in the other x-y plane coordinate, said adjuster is configured to reset the x-y plane coordinate with smaller sensed displacement to reflect orthogonal movement.

14. The computer system pointing device of claim 11 wherein when the sensed displacement in the first and the second x-y plane coordinates is substantially equal, said adjuster is configured to change the sensed displacement for each x-y plane coordinate to be equal to reflect diagonal movement.

15. A pointing device comprising: a plurality of Keys; a housing; at least one sensor carried by said housing and being configured to sense data representing displacement information; a mode selector module carried by said housing and being configured to toggle between a first and a second mode of operation based upon said plurality of keys receiving a desired input sequence; and an adjuster carried by said housing and being configured to adjust the displacement information by at least adjusting a first of the x-y plane coordinates defined as first displacement information based upon a second of the x-y plane coordinates defined as second displacement information, when the second mode of operation is selected, and when the first mode of operation is selected, to perform no adjustment to the displacement information; said adjuster comprising a comparator configured to compare the first and second displacement information, and a resetting unit configured to reset one of the first and second displacement information based upon size of a respective displacement value in the first and second displacement information and the adjuster is configured to adjust the value of the first displacement information to the value of the second displacement information when the value of the first displacement information does not exceed the second displacement information by more than a threshold.

16. The pointing device of claim 15, wherein the pointing device is an optical mouse or a wireless optical mouse.

17. The pointing device of claim 15, wherein the resetting unit comprises an XOR circuit.

* * * * *

UNITED STATES PATENT AND TRADEMARK OFFICE
CERTIFICATE OF CORRECTION

| | | |
|---|---|---|
| PATENT NO. | : 7,990,364 B2 | Page 1 of 1 |
| APPLICATION NO. | : 11/398042 | |
| DATED | : August 2, 2011 | |
| INVENTOR(S) | : Adler et al. | |

It is certified that error appears in the above-identified patent and that said Letters Patent is hereby corrected as shown below:

Column 1, Line 49  Delete "includes"
 Insert: --include--

Column 6, Line 14  Delete: "claim"
 Insert: --claim 1--

Signed and Sealed this
Twenty-first Day of February, 2012

David J. Kappos
*Director of the United States Patent and Trademark Office*